United States Patent [19]
Bross et al.

[11] Patent Number: 5,362,360
[45] Date of Patent: Nov. 8, 1994

[54] METHOD AND PRODUCT FOR EXTRUDING MATERIALS THAT EXHIBIT ANISOTROPIC PROPERTIES BY MEANS OF RECIPROCATING DIE SURFACES

[75] Inventors: Arthur Bross; Thomas J. Walsh, both of Poughkeepsie, N.Y.

[73] Assignee: International Business Machines Corporation, Armonk, N.Y.

[21] Appl. No.: 157,810

[22] Filed: Nov. 24, 1993

Related U.S. Application Data

[62] Division of Ser. No. 904,742, Jun. 26, 1992, Pat. No. 5,312,238.

[51] Int. Cl.$^5$ .......................... B44C 1/22; C23F 1/00; B28B 3/20; B32B 5/12
[52] U.S. Cl. ................................ 156/656; 156/659.1; 156/902; 156/244.24; 264/176.1; 428/105; 428/901
[58] Field of Search ............ 156/244.15, 244.18, 156/244.25, 656, 659.1, 666, 902, 244.24; 264/539, 540, 541, 555, 167, 176.1, 177.16, DIG. 8, DIG. 47; 425/131.1; 428/131, 137, 138, 134, 136, 105-109, 901

[56] References Cited

U.S. PATENT DOCUMENTS 3,846,205  11/1974  Yazawa ................. 264/DIG. 47 X
4,430,284   2/1984  Rasmussen ............. 156/244.18 X

*Primary Examiner*—William Powell
*Attorney, Agent, or Firm*—Whitham, Curtis, Whitham & McGinn

[57] ABSTRACT

Two movable die members that are situated opposed to each other in an extrusion die assembly, the axis of movement of the two die members is parallel to the longer sides of the rectangular cross-section of a throat opening of the extrusion die assembly. The members move in a reciprocating back and forward movement to impart shearing forces to the surface of the extruded material with a resultant multiaxial orientation of the molecules or fibrils.

6 Claims, 4 Drawing Sheets

METHOD AND PRODUCT FOR EXTRUDING MATERIALS THAT EXHIBIT ANISOTROPIC PROPERTIES BY MEANS OF RECIPROCATING DIE SURFACES

CROSS REFERENCE TO RELATED APPLICATION

"This application is a divisional of co-pending application Ser. No. 07/904,742, filed on Jun. 26, 1992, now U.S. Pat. No. 5,312,238."

The disclosure of this application is related in subject matter to that of the following U.S. application Ser. No. 07/904,754 filed Jun. 24, 1992, now U.S. Pat. No. 5,326,245 by Arthur Bross, et al., for "Method and Apparatus for Extruding Materials That Exhibit Anisotropic Properties Due to Molecular or Fibril Orientation As a Result of the Extrusion Process" which is assigned to the assignee of this application. The contents of the applications is herein incorporated by reference.

DESCRIPTION

BACKGROUND OF THE INVENTION

1. Field of the Invention

This invention relates to a method and apparatus for extruding polymer, ceramic, composite, and other materials that exhibit anisotropic properties due to molecular or fibril orientation along a single axis as a result of the extrusion process. More particularly, the invention relates to an improved extrusion method and apparatus that provides a multi-axis orientation of molecules or fibrils in the extruded material by means of reciprocating die surfaces.

2. Description of the Prior Art Certain polymers (important examples are liquid crystal polymers), composites, and ceramics are comprised of molecules and/or fibrils that become more or less orientated along a single axis when extruded through fixed die openings. The resultant extruded films, sheets, or parts have physical thermal, chemical and electrical properties that are anisotropic; i.e., one value in the direction of orientation and another value in a direction perpendicular to the direction of orientation. FIG. 1 is a schematic view of a flat sheet extruded with a conventional die assembly. As illustrated by the dashed lines, elongated elements (e.g. fibrils in a liquid crystal polymer) are oriented in the flow direction (indicated by the arrow) through the die assembly.

The prior art has proposed applying a shearing force to the surfaces of the material in the liquid state as part of the extrusion process. This force produces a multiaxial orientation and a resultant extruded material that is less anisotropic than that produced with fixed extrusion dies. These proposals include the following U.S. patents.

U.S. Pat. No. 4,450,131 discloses a die assembly for extruding a liquid crystal polymer with two rotating cylindrical die members of different diameter which are situated coaxially;

U.S. Pat. No. 4,496,413 discloses a die assembly with a cylindrical tubular die member surrounding a solid counter-rotating core; and U.S. Pat. No. 4,420,451 discloses a method for film extrusion comprising rotary die parts. The die parts comprise different diameters and are arranged surrounding each other.

In these prior art devices the material is extruded in the forth of a tube. To form a sheet material the tube has to be cut or folded upon itself, which is disadvantageous.

SUMMARY OF THE INVENTION

It is therefore an object of the present invention to provide an extrusion die assembly for continuously extruding a material containing elongated elements to produce a material with structural multiaxial orientation in sheet form.

Briefly, the invention contemplates the use of two movable die members that are situated opposed to each other in an extrusion die assembly, the axis of movement of the two die members is parallel to the longer sides of the rectangular cross-section of a throat opening of the extrusion die assembly. The members move in a reciprocating back and forward movement to impart shearing forces to the surface of the extruded material with a resultant multiaxial orientation of the molecules or fibrils.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 2:
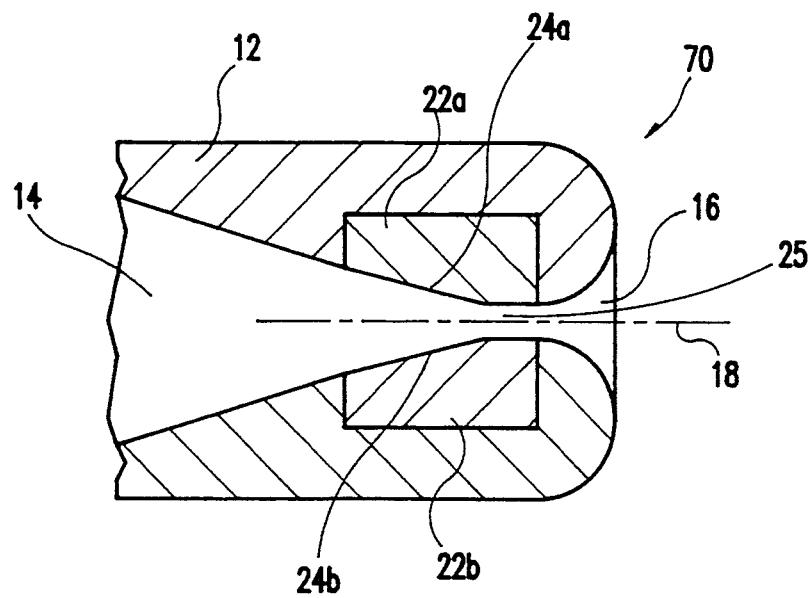
FIG. 2 is a cross-section of a die assembly according to a first embodiment of the invention.
Figure 3:
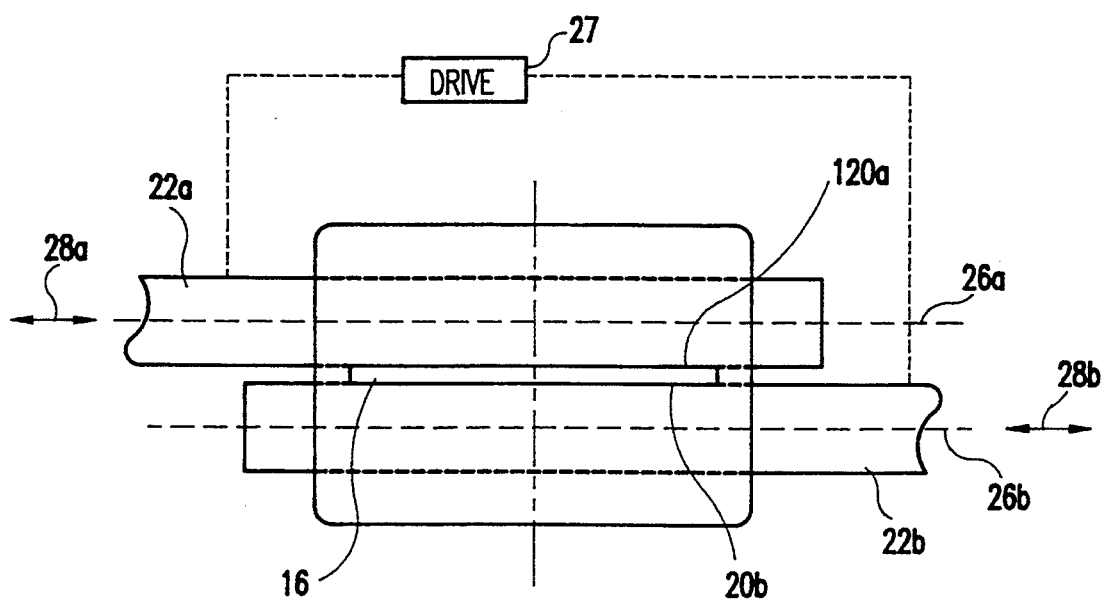
FIG. 3 is a front view of the die assembly of FIG. 2.

Referring now to the drawings, and more particularly to FIGS. 2 and 3, there is shown a cross-section through a extrusion die assembly 10 with a housing 12 forming a passageway 14 for the material to be extruded. The pressurized material is urged through a throat opening 16 with a rectangular cross-section, where it leaves the die assembly continuously and forms a strip of sheet material. The passageway 14 has a geometrical main axis 18, representing the flow direction. As can be seen in FIG. 3, throat opening 16 has a rectangular cross-section with two parallel longer sides 20A and 20B. In general the passageway 14 within housing 12 can curve, but will have a section perpendicular adjacent to the throat opening 16 so that flow direction or main axis 18 and the plane of the throat opening are perpendicular to each other. Two movable die members 22A and 22B are arranged parallel to the longer sides 20A and 20B of throat opening 16. The movable die members 22A and 22B have a surface 24A and 24B, facing each other and leaving a gap 25 in between. Surfaces 24A and 24B form a tapering section of passageway 14.

Movable die members 22A and 22B are driven by a drive mechanism 27. Any mechanism well known in the art can be used to produce a reciprocating back- and forward motion. Movable die members move reciprocating along an axis 26A and 26B, respectively, said axis being parallel to said longer sides of rectangular cross-section of throat opening 16, i.e. the axis of the movable members is transverse to the flow of the extruded material. As indicated by arrows 28A and 28B in FIG. 3 movable die members 22A and 22B move in a back and forward motion, the motion of the two members being reciprocal, i.e. when for example upper die member 22A travels towards the left in FIG. 3 lower die member 22B travels towards the right and vice versa. The axis of movement of the two movable die members are perpendicular to the main axis 18. The latter is the same as the flow direction of the extrusion material through passageway 14.

The pressurized material coming from an extruder, e.g. a screw type extruding machine, flows through the tapering passageway 14 and reaches the gap 25 formed by the two moving die surfaces 24A and 24B. Due to the friction between the material, e.g. liquid crystal polymer, and the die surfaces shear forces are induced into the material.

Figure 1:
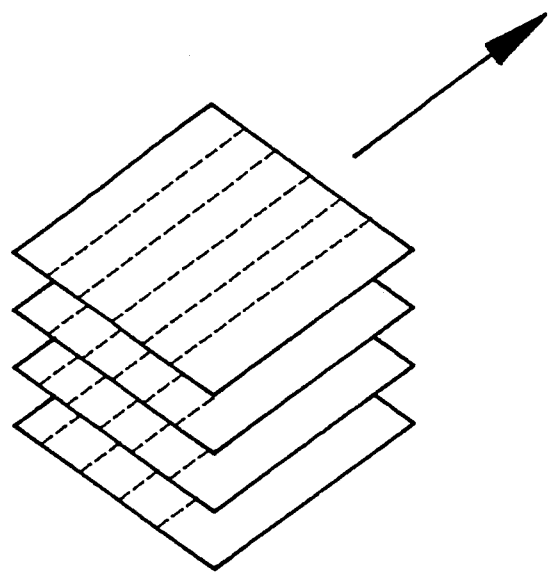
FIG. 1 is a schematic perspective view of layers of a material extruded with a conventional die assembly.
Figure 4:
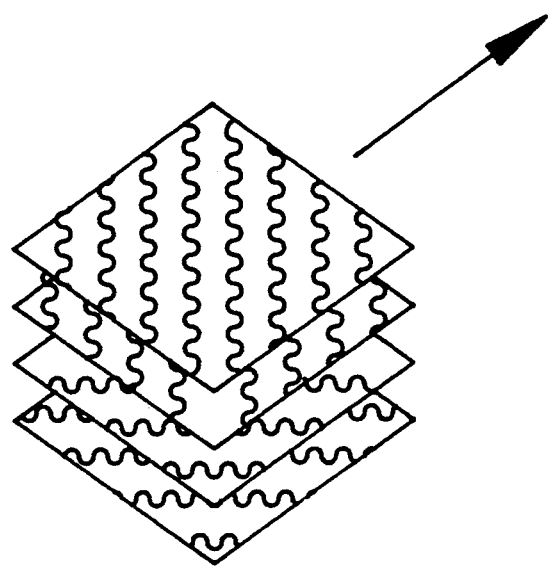
FIG. 4 is a schematic perspective view of layers of a material extruded with a die assembly according to the first embodiment of the invention.

Due to the reciprocal movement of the movable members the orientation of the molecules in one layer changes in the form of a zig-zag or herring bone pattern, as indicated in FIG. 4. Orientation of the chainlike molecules, fibrils or the like can also be influenced by altering the reciprocating speed of the die members, the flow velocity or the viscosity of the extruded material or by influencing the solidification process.

The shear forces induced into the material are also dependent on the roughness of the die surfaces, as the friction provided between the moving surface and the material to be extruded is the greater the rougher the surface is.

Figure 5:
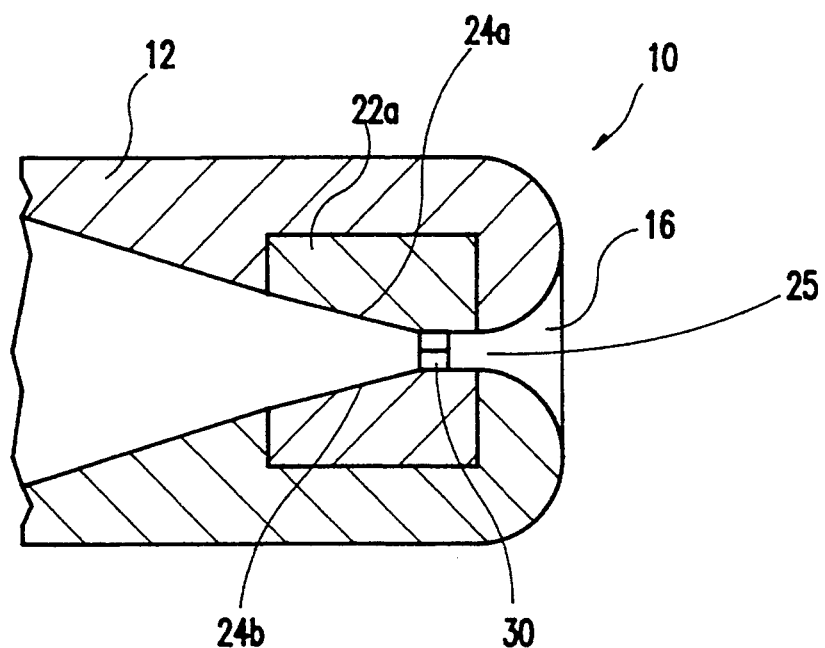
FIG. 5 is a cross-section of a die assembly according to a second embodiment of the invention
Figure 6:
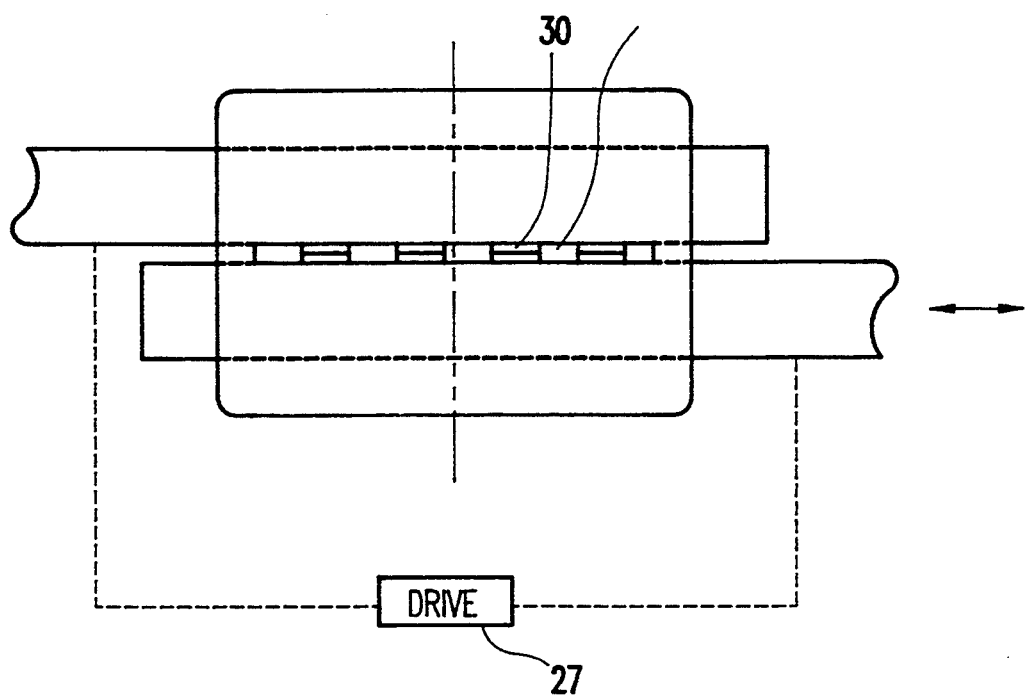
FIG. 6 is a front view Of the die assembly of FIG. 5.

FIGS. 5 and 6 show another embodiment of the invention. The surfaces 24A and 24B of the moving die member have a number of teeth 30 protruding from the surface. The shear forces are partially induced into the material to be extruded via a form closure between teeth 30 and material situated in adjacent slots 32, thus inducing higher shear forces as compared to a friction transmission as described in the first embodiment of the invention. The resulting pattern of orientation of molecules or fibrils is the same as shown in FIG. 4, i.e. a herring bone pattern due to the reciprocating movement of the die members. One advantage of the embodiment using teeth to provide a form closure force transmission is that material with a higher viscosity can be handled.

The teeth shown in FIGS. 5 and 6 each extend to a depth of 50% of the gap width so that each imports a like orientation halfway through the extruded material; the upper teeth halfway in one direction and the lower teeth halfway in the opposite direction. By changing the depth of the teeth, the fibril orientation of the sheet can be proportioned differently with a transition region in the extruded material between an opening in teeth that extend less than 50% or where the teeth are not directly in the extruded flow path.

Figure 7:
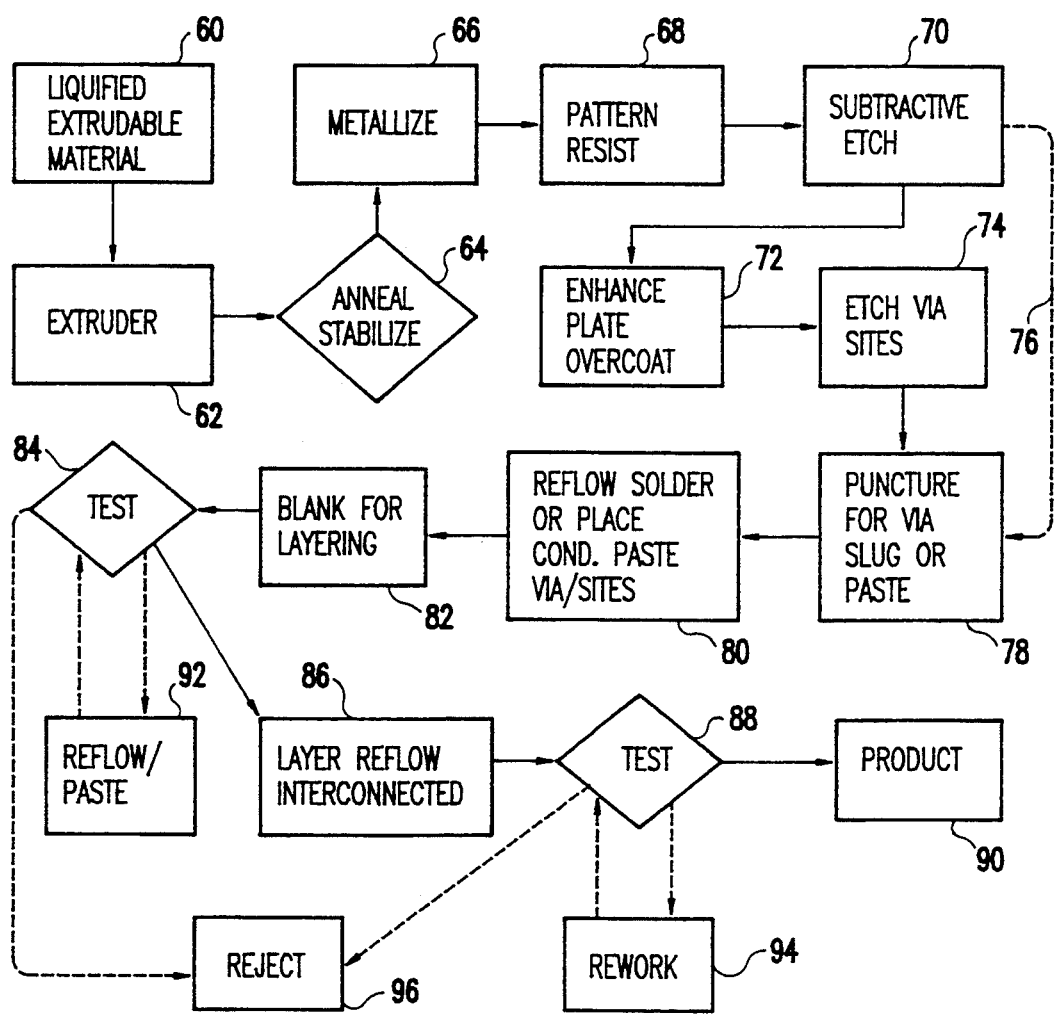
FIG. 7 is a scheme of a process using a die assembly according to the invention.

FIG. 7 describes a method which is useful for a line process for producing multi-layered products for electronic applications such as substrates, printed circuit cards, interposers, sockets, connectors or the like. The method uses an extrusion die assembly according to the invention.

In a first step 60, a liquified extrudable material, like liquid crystal polymer, is extruded using a extrusion die assembly 62, according to the invention. The extruded material is then annealed and stabilized in a step 64. In a step 66 the annealed sheet material is metallized, covering one or both sides of the sheet material with a metal layer. Known techniques such as plating, layering, vaporizing or sputtering can be used. In a step 68 a resist pattern is applied to the metallized layer using a known photoresist process, followed by subtractive etching in a step 70. The sheet will then be plated or coated for protection in a step 72. Via sites are etched in a step 74. The last two steps can be omitted. The process would then follow a dotted path 76 in FIG. 9.

In a step 78, via holes are punctured and vias with conductive slugs or other conductive media are inserted to connect different layers electrically. The next step 80 is a reflow of a eutectic solder surface or placement of metal paste at the via sites, followed by registered blanking to size for layering in step 82. The blanked sheets are tested in step 84 and layered sheets are interconnected via a reflow through an appropriate heat and pressure system 86. After another test step 88, an approved product is complete (step 90).

If test 84 or 88 is negative, a reflow/paste step, or a rework step 92 or 94, respectively, can be inserted, if the sheet is deemed reworkable. Otherwise the sheet is rejected in a step 96.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for extruding a material that is comprised of molecules or fibrils that exhibit anisotropic properties due to molecular or fibril orientation along a single axis as a result of the extrusion process, comprising the steps of:

forcing the material to be extruded in a liquid state through a die in which an upper planar die surface moves in a first direction transverse to the direction of material flow through the die and a low planar die surface moves in a direction opposite said first direction; and changing the direction of movement of said upper a lower surface at determined time intervals.

2. A method as recited in claim 1 further including the step of moving said material in a direction transverse to the flow direction by means of teeth situated on said die surfaces.

3. A method for making a multilayer circuit substrate, using a polymer, such as a liquid crystal polymer, a ceramic, or composite material that is comprised of molecules or fibrils that exhibit anisotropic properties due to molecular or fibril orientation along a single axis as a result of the extrusion process, comprising the steps of:

forcing the material to be extruded in a liquid state through a die in which an upper planar die surface moves in first direction transverse to the direction of material flow through the die and a lower planar die surface moves in a direction opposite said first direction; and changing the direction of movement of said upper and said lower surface at determined time intervals;

metallizing the sheet;

patterning a resist on the metallized sheet;

etching the metallized sheet to form a conductive pattern;
forming vias in the metallized sheet;
adding solder to the vias for connectivity; and
blanking the layers.

4. An extruded material in which the molecules or fibrils of the material are oriented during the extrusion process in a pattern that is undulating in the direction of material flow during the extrusion process.

5. An extruded material as in claim 4, in which the undulating fibril or molecular orientation changes direction from a top surface of the material to a bottom surface of the material.

6. An extruded material as in claim 5, wherein the undulating fibril or molecular orientation at the top surface is in a direction opposite the fibril or molecular orientation at the bottom surface.

* * * * *